Aug. 21, 1951 J. W. KAYE 2,564,905
SHOCK ABSORBING WHEEL
Filed Oct. 28, 1946 3 Sheets-Sheet 1

John W. Kaye
INVENTOR.

BY Ashley & Ashley

ATTORNEYS

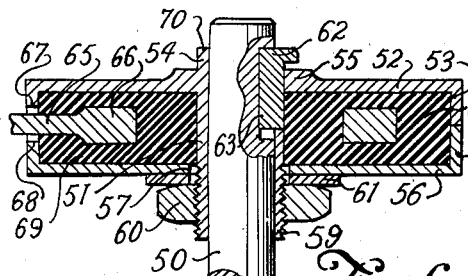

Aug. 21, 1951  J. W. KAYE  2,564,905
SHOCK ABSORBING WHEEL
Filed Oct. 28, 1946  3 Sheets-Sheet 3

John W. Kaye
INVENTOR.

BY Ashley & Ashley
ATTORNEYS

Patented Aug. 21, 1951

2,564,905

UNITED STATES PATENT OFFICE 2,564,905

SHOCK ABSORBING WHEEL

John W. Kaye, San Antonio, Tex.

Application October 28, 1946, Serial No. 706,184

3 Claims. (Cl. 64—11)

This invention relates to new and useful improvements in shock absorbing wheels.

It is one object of this invention to provide an improved shock absorbing wheel which eliminates substantially all transmission of vibration from the hub to the rim or in a reverse direction, so that the wheel may be utilized for a steering wheel to eliminate the sensation of vibration and road shock, or as a vehicle wheel, or other wheel, to eliminate transmission of vibration and noise from the rim of the wheel to the shaft upon which it is mounted.

Another object of this invention is to provide an improved shock absorbing wheel journal wherein wherein all direct metal to metal connection between the wheel rim and the shaft upon which it is mounted is eliminated.

Yet another object of the invention is to provide an improved shock absorbing wheel which is simple yet efficient in design, and which may be easily and quickly dissembled for repair or replacement of parts.

A still further object of the invention is to provide an improved shock absorbing wheel journal which provides for a secure mounting and connection of a wheel upon a shaft, and at the same time provides sufficient flexibility as to eliminate undesirable vibration and other undesirable effects.

A construction designed to carry out the invention will be hereinafter described together with other features of the invention.

Figure 1:
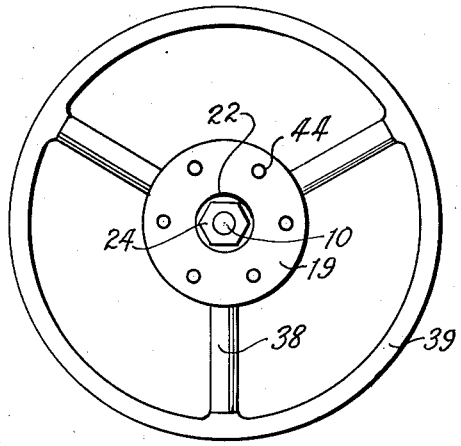
Figure 4:
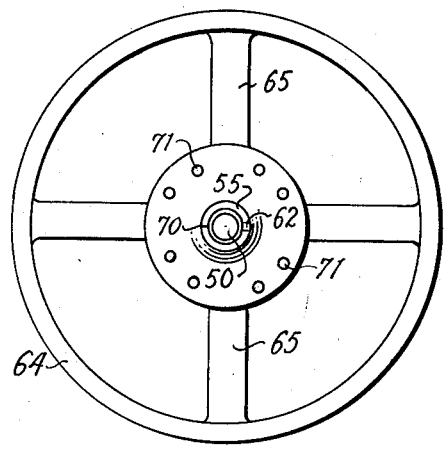
Figure 2:
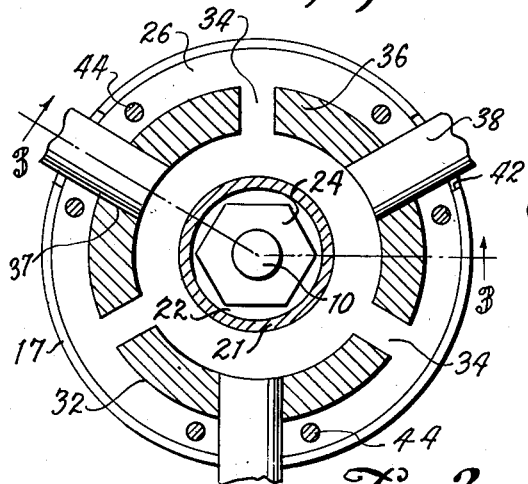
Figure 5:
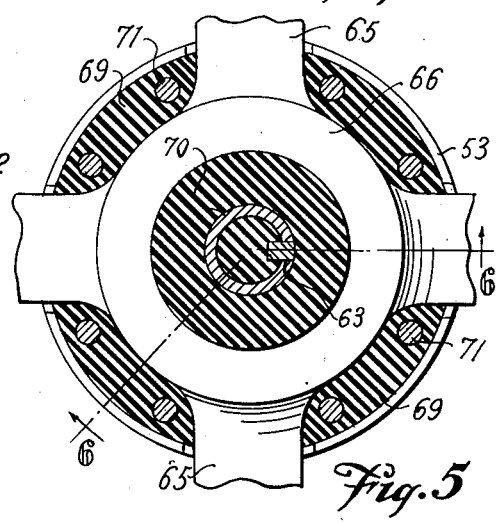
Figure 3:
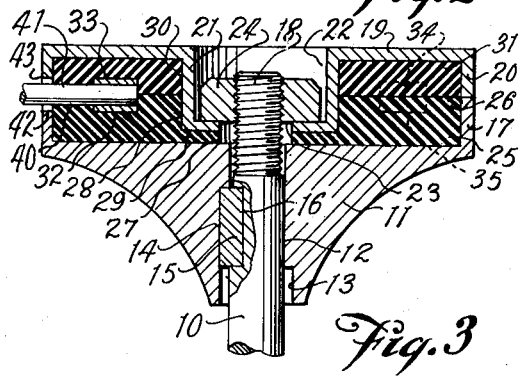
Figure 12:
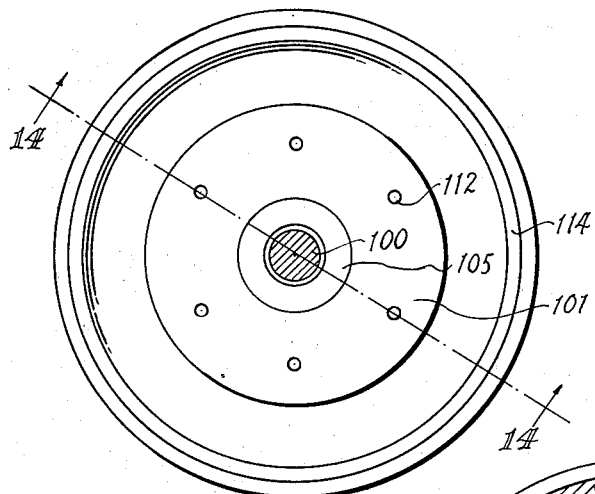
Figure 13:
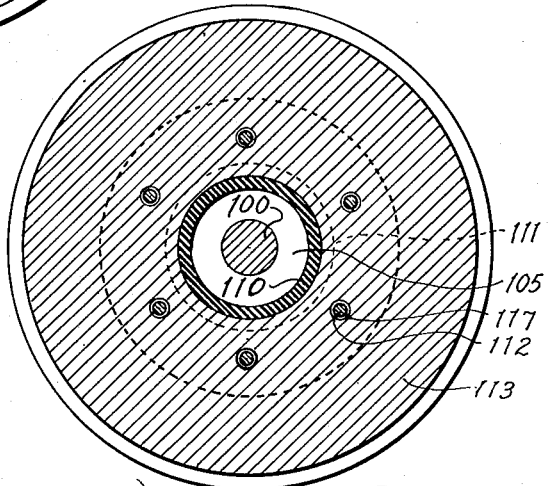
Figure 14:
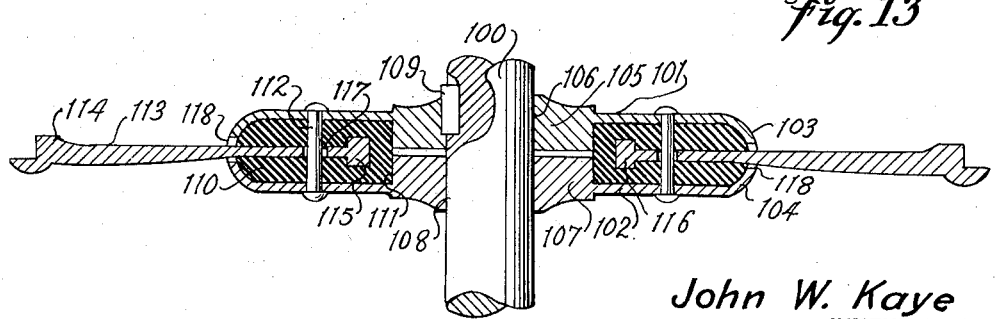

The invention will be more readily understood from a reading of the following specification and by reference to the accompanying drawings, wherein an example of the invention is shown, and wherein:

Fig. 1 is a plan view of a wheel constructed in accordance with this invention and mounted upon a shaft, Fig. 2 is an enlarged horizontal, sectional view of the hub portion of the wheel, Fig. 3 is a vertical, sectional view taken upon the line 3—3 of Fig. 2, Fig. 4 is a plan view of the modification of the invention, and showing a wheel constructed in accordance therewith, Fig. 5 is a horizontal, cross-sectional view of the wheel shown in Fig. 4, Fig. 6 is a vertical, sectional view taken on the line 6—6 of Fig. 5, Fig. 7 is a plan view of a further modification of the invention, and showing a wheel constructed in accordance therewith, Fig. 8 is an enlarged, horizontal, cross-sectional view of the hub portion of the wheel shown in Fig. 7, Fig. 9 is a vertical, sectional view taken on the line 9—9 of Fig. 8, Fig. 10 is an enlarged, vertical, sectional view taken on the line 10—10 of Fig. 8 and showing a typical clamping bolt as utilized in this invention, Fig. 11 is an enlarged perspective view, partially in section, of the shock absorbing member utilized in the form of the invention shown in Fig. 7, Fig. 12 is a plan view of a further modification of the invention, Fig. 13 is a horizontal, sectional view of the form shown in Fig. 12, and Fig. 14 is an enlarged, vertical, sectional view taken on the line 14—14 of Fig. 12.

In the drawings, in Figs. 1, 2, and 3, the numeral 10 designates a shaft upon which a shock absorbing wheel is to be mounted. A conical hub 11 is provided with an axial bore 12 through which the shaft 10 extends. The lower, or conical, face of the hub is curved or dished inwardly as shown in Fig. 3 of the drawing. The lower end 13 of the bore 11 is enlarged, and an axial groove 14 extends upwardly therefrom in the sidewall of the bore 12. A suitable key 15 engages within the groove 14 and also within an elongate recess 16 provided in the outer surface of the shaft 10 to receive said key. The shaft is thus held against rotation with respect to the hub 11.

The upper portion of the hub is circular and is provided with an upstanding marginal flange 17. The upper end of the shaft 10 projects a short distance above the upper surface of the hub and carries external screw threads 18. A circular cover plate 19 is provided, the plate 19 being substantially equal in diameter to the upper portion of the hub 11. The plate is provided with a depending marginal flange 20 which is complementary to the upstanding flange 17 and adapted to rest thereon so as to space the plate 19 above the upper surface of the hub. The central portion of the plate 19 is deformed downwardly to form a depending cylindrical boss 21 and a cylindrical recess 22 within said boss. The plate 19 may be formed of sheet metal, or cast, or otherwise suitably formed of any desirable or suitable material. As will be explained hereinafter, it is not necessary that the flanges 17 and 20 be in contact; however, this is the normal position of the flanges and the plate and hub.

The boss 21 is formed with a circular opening 23 in its lower face, said opening communicating with the bottom of the recess 22. The screw threaded portion of the shaft 10 extends upwardly through the opening 23 and receives a suitable nut 24 thereabove. Obviously, the nut 24 may be rotated to squeeze the plate 19 and the hub 11 together.

A resilient retaining element 25 is disposed between the hub 11 and the cover plate 19 so as to be confined therebetween within the flanges 17 and 20. The element 25 is in the form of a pair of circular disks substantially equal in diameter to the inside diameter of the flanges 17 and 20. The disks may be formed of rubber or any other suitable resilient material having the properties of flexibility and elasticity similar to those displayed by natural rubber.

The lower disk 26 is formed with a central opening 27 which receives the upper end of the shaft 10, the opening being somewhat greater in diameter than said shaft. The opening 27 is enlarged in the upper portion of the disk 26 to form a counterbore 28 which receives the lower end of the boss 21. An internal annular flange 29 is thus provided below the counterbore 28, said flange projecting radially and inwardly beneath the lower face of the boss 21, so as to be clamped between said face and the upper face of the hub 11. A central or axial bore 30 is also provided in the uppermost resilient element or disk 31, the bore 30 being equal in diameter to the counterbore 28 so as to receive the boss 21. The upper portion or face of the upper disk 31 engages the underside of the cover plate 19. The two disks 26 and 31 thus are shaped so as to fill substantially, completely the housing between the hub and the cover plate.

Each of the disks 26 and 31 are provided on their abutting faces with a plurality of semicircular grooves 32 and 33, respectively. The grooves 32 and 33 are rectangular in cross-section and so arranged as to be in vertical alinement when the disks are placed face to face between the coverplate 19 and the hub 11. In the example shown in the drawing, three of these grooves are provided. Obviously, any desirable number of grooves may be utilized. As is shown in Fig. 2 of the drawing, webs 34 are formed between the ends of adjacent grooves so as to separate the same. The entire set of grooves in either of the disks form segments of one continuous circle, so that in effect, a continuous, concentric, circular groove is formed in each of the resilient disks, the groove being interrupted at intervals by the transverse webs 34. The grooves in the upper and the lower disks are dimensioned similarly so that when the disks are superposed, the grooves and the webs match so that a series of arcuate pockets or recesses 35 are formed in the intermediate portion of the resilient element 25.

Arcuate anchor bars 36, rectangular in cross section so as to fit snugly within the recesses 35, are adapted to engage within said recesses. The length of the anchor bars 36 is essentially equal to the length of the grooves 32 and 33, whereby the bars are securely positioned within the body of the resilient element 25.

Each of the bars 36 is formed with a transverse opening 37 intermediate its ends, said opening receiving the inner end of a radially directed spoke 38. The spokes 38 may be secured within the openings 37 by welding or brazing, or by any other suitable means. The spokes are oval in cross section and project radially outwardly from the bars 36, through the flanges 17 and 20 to a point spaced a considerable distance outwardly from the hub 11. The outer ends of the spokes 38 are connected by a circular rim or wheel 39. Since the invention may be applied to various elements such as steering wheels, or car wheels, or belt pulleys and the like, the nature of the rim 39 may vary considerably, as well as the configuration of the spokes 38. In the example shown in the drawings, a steering wheel has been utilized to display the invention. However, it is to be noted that any desirable wheel structure may be adapted to this construction.

To make provisions for the spokes 38, the resilient disks 26 and 31 are provided with relatively shallow grooves 40 and 41, respectively, which grooves extend radially outwardly from the intermediate or central portion of each of the grooves 32 and 33. In addition, the flanges 17 and 20 are provided with suitable semi-circular notches 42 and 43, respectively, to provide clearance for said spokes. As will be noted in Figs. 2 and 3, the notches 42 and 43 are considerably larger in cross section or area than the cross section of the spokes 38, so that all possibility of metal to metal contact between the spokes and said flanges is substantially eliminated.

A plurality of vertical bolts 44 extend downwardly through the cover plate 19, the disks 26 and 31, and engage within the hub 11. Any desirable number of bolts may be provided, but it has been found desirable to position one bolt on either side of each of the spokes 38 near the outer edge of the cover plate 19. The bolts serve to further clamp the cover plate to the hub and more securely confine the resilient element 25 therebetween.

In the operation of this device, such shocks or variations in torsional force as are delivered to the shaft 10 or the rim 29 will not be transmitted to the opposite element. Thus, if the device is utilized in a steering wheel road shock and vibration will not be transferred from the shaft 10 to the rim 39 so as to discomfort the operator of the vehicle.

The resiliency of the element 26 is sufficient to absorb and gradually dissipate such shock or such variations in torsional force. There is sufficient clearance around the spokes 38 within the notches 42 and 43, and between the inner periphery of the flange 29 and the shaft 10 to allow a moderate distortion of the resilient element 25. Such distortion operates as a shock absorber to minimize the transmission of vibration and the other undesirable elements pointed out hereinbefore.

At the same time, the rim 39 is amply secured to the shaft 10 by reason of the anchor bars 36 and the bolts 44, so that a secure purchase upon the shaft 10 is provided at all times. In a similar manner, the hub may be utilized for pulleys or car wheels to minimize the transmission of shock and vibration, an additional feature in such a use being the reduction of wheel noise usually encountered in such structures. The resilient element 25 acts as a sound dampener as well as a shock absorber and will minimize the running noise of, for example, a street car wheel.

In Figs. 4, 5 and 6 of the drawings is shown a modified form of this invention. In this modification, a different structure is provided for the resilient element and the anchoring means, as well as altered means for securing the shaft within the hub. In this form, the shaft 50 is received within a depending, integral sleeve 51 formed centrally of a circular, disk-like cover or top plate 52. The plate 52 is formed with a depending marginal flange 53 similar to the flange 20 described in the first form of the invention. A short upstanding sleeve 54 is provided on the upper face of the plate in vertical alinement with the sleeve 51, the sleeve 54 being formed integrally of the plate and surrounded by an enlarged or thickened section 55 which serves to strengthen the plate at this point.

A circular lower or bottom plate 56, equal in diameter to the plate 62, is provided with a central opening 57 adapted to receive the depending sleeve 51. The plate 56 is formed with an upstanding marginal flange 58, similar to the flange 17, which is complementary to the flange 53 and adapted to engage thereagainst and form a housing around the sleeve 51 and between the upper and lower plates.

The lower portion of the sleeve 51 carries external screw threads 59 which are engaged by a relatively flat nut 60. A flat washer 61 is confined between the nut 60 and the lower surface of the bottom plate 56. Obviously, by means of the nut 60 the top plate 52 and bottom plate 56 may be forced together to any desirable extent. For locking the shaft 50 within the sleeve 51, a suitable key 62 is provided. The key 62 engages within a longitudinal groove 63, formed in the outer surface of the shaft, and also within a longitudinal slot 63 cut in the upper portion of the sleeves 54 and 51. Thus, the shaft 50 is held against rotative movement with respect to the top plate 52.

This modification of the invention is constructed with a wheel rim 64 similar to the rim 39, which rim is provided with a plurality of radially and inwardly directed spokes 65. It is to be noted, that in the particular structure shown in the drawing four of the spokes 65 are utilized. Obviously, any desirable or suitable number of spokes could be employed without departing from the spirit of this invention.

The inner end of the spokes 65 are formed integrally with a circular ring 66 which is slightly greater in thickness than the spokes. The thickness of the ring is less than the distance between the inner faces of the top and bottom covers 52 and 56, as shown in Fig. 6 of the drawing, while the inside and outside diameters of the ring are such as to space it a considerable distance from the sleeve 51 and the flanges 53 and 58. The ring is thus situated within the housing enclosed by the top and bottom plate so as to be substantially equidistance from the walls thereof. The flanges 53 and 58 are provided with semi-circular notches 67 and 68 respectively, which are adapted to be in vertical alinement when the structure is assembled and to receive the inner portions of the spokes 65. The openings thus provided for the spokes are somewhat larger in area than the cross sectional area of the spokes so that there is no direct contact between the latter and the marginal flanges 53 and 58.

To support and hold the ring 66 and the connected spokes within the chamber enclosed by the top and bottom plates, a suitable resilient element 69 is provided. In contrast to the first form of the invention, described hereinbefore, the element 69 is formed in one piece around the ring and spokes as shown in Figs. 5 and 6 and is in the form of a relatively thin, circular disk, substantially equal in all dimensions to the chamber enclosed by the top and bottom plate, whereby the spokes 65 and rim 64 are held in a positive fashion within the space between said top and bottom plate. Thus, the various elements recited are united to the shaft 50. For further securing of the top and bottom plates, one to the other, and to the resilient element 69 along with the ring and spoke structure, a plurality of transverse bolts 71, similar to the bolts 44, extend vertically through the top and bottom plates, extending through the marginal portion of the resilient element therebetween. As shown in Fig. 5, one of the bolts 71 is positioned on either side and adjacent to each of the spokes 65. Obviously, by tightening the bolts, the top and bottom plates 52 and 56 are further clamped and secured together, and at the same time a more secure and rigid mounting for the resilient element 69 is provided.

This form of the invention functions in substantially the same manner as that set forth hereinbefore in the description of the first form of the invention. The same advantages and desirable results are also obtained in this modified structure.

A third form of the invention is shown in Figs. 7, 8, and 9. This form of the invention represents a simplification of the first form and utilizes a pair of plates 80, circular in shape and having depending marginal flanges 81. The plates are placed together in such a position as to allow the edges of the flanges 81 to abut and enclose a pair of complementary resilient elements 82, similar to the upper element 31 previously described. The elements 82 are provided with a central axial opening 83 in vertical alinement with central openings 84 formed in the plate 80. The openings 83 are slightly greater in diameter than the openings 84 whereby a shaft (not shown) extending through the latter openings will not contact the side walls of the openings 83.

The resilient elements or disks 82 are also provided with arcuate grooves 85, similar to the grooves 33 and 32, the grooves 85 being adapted to receive arcuate bars or anchor means 86, similar to the bars 36. In this form of the invention, double spokes 87 are provided, each spoke being formed of a pair of parallel cylindrical rods 88 of relatively small cross section. The inner ends of the rods are secured to the bars 86 and extend radially and outwardly therefrom. A suitable rim or wheel 89 is mounted upon the outer ends of the rods, as in the form described hereinbefore. The flanges 81 are provided with semi-circular notches 90 which provide peripheral openings through which the spokes may extend. As in the previous forms, the notches are such size as to form openings greater in cross section than the cross sectional area of the spokes so that the latter do not contact the flanges or the top and bottom plates.

The resilient elements 82 are so dimensioned as to have a snug fit between the top and bottom plate within the marginal flanges thereof. The grooves 85 are of such dimension as to have snug engagement with all portions of the bars 86 and are provided with a pair of radial grooves 91, semi-circular in cross section extending outwardly from each of the grooves 85. Obviously, the grooves 91 receive the inner portion of the spokes 87 and have a snug fit therewith. Substantially the entire housing between the top and bottom plates is occupied by the resilient elements 82 whereby a secure and reliable mounting for the bars 86, along with the spokes 87 and rim 89, is provided. At the same time, sufficient space exists within the axial bores or openings 83 to allow some distortion of the resilient elements and insure the proper shock-absorbing and anti-vibrational functions of this wheel mounting.

In Fig. 10 of the drawings is shown an example of the positioning and relation to the other elements of the wheel mountings to one of the clamping bolts. This illustration is applicable to the form of invention just described and is described therewith. However, this view is also exemplary of the bolt mounting in the other forms of the invention previously described.

In the application of this structure to the last form described, the plates 82 are provided with transverse openings 92 near their marginal edges. The openings in one plate are adapted to be in vertical alinement with those of the opposite plate in the completed structure. The resilient elements 82 are also provided with transverse, marginal openings 93 in vertical alinement with the openings 92 and suitable bolts 94 extend therethrough. The bolts are provided with the usual head 95 which engages the outer surface of one plate, and the usual nut 96 which engages the outer surface of the opposite plate. The bolts may be tightened to clamp the marginal portions of the top and bottom plates together and secure the resilient element and wheel and spoke structure therebetween. The bolts are positioned one on either side of each of the spokes at a point adjacent the spokes so as to aid in the securing and mounting of the spoke and wheel structure. If desired, the head 95 of the bolt may be countersunk in one of the plates 80, although such structure is optional and not required. This latter form of the invention again exhibits the same desirable characteristics as those previously described for the first form of the invention. A substantially vibration and shock free structure is provided, a structure which is applicable to many uses.

An additional modification of this invention, adapted to solid or disk wheels, is shown in Figs. 12, 13, and 14 of the drawings. In this form, the numeral 100 designates a cylindrical shaft upon which the wheel is mounted. The wheel includes a complementary pair of housing plates 101 and 102, the numerals identifying the upper and lower plates respectively. The plates are circular in shape and formed with inwardly curved, marginal flanges or skirts 103 and 104, said skirts being directed toward each other.

The upper plate 101 carries a central hub 105 which projects downwardly and axially of the plate and is provided with an axial bore 106. The hub also projects slightly above the plate. A similar, complementary hub 107 is provided centrally of the lower plate 102 and projects thereabove as well as slightly therebelow. The hub 107 has an axial bore 108 in vertical alinement with the bore 106 and similar thereto. The shaft 100 extends through both bores, being connected to the hub 105 by a suitable key 109.

The plates 101 and 102 are mounted upon the shaft 100 so as to have the hubs 105 and 107 adjacent and the marginal flanges 103 and 104 directed toward each other, thereby substantially enclosing a housing within and between said plates. Neither the hubs or the flanges are necessarily in contact, and in most instances will not be in contact but serve to define and enclose the space referred to hereinbefore.

A resilient disk-like element 110, formed of rubber or some similar or suitable material, is disposed within this housing and formed with a central, transverse bore or opening 111 to receive the hubs 105 and 107. The periphery of the element is rounded to conform to the curved flanges 103 and 104, so that the element has a snug fit within and between the plates. A plurality of suitable bolts or rivets 112 extend transversely of the plates through the resilient element to secure the plates together and bind the element therebetween. Normally, as shown in Fig. 14, with the center portion of the wheel thus assembled, there is a slight clearance between the inner ends of the hubs 105 and 107, and a somewhat greater clearance between the inner edges of the flanges 103 and 104, so that the resilient element is free to be distorted.

A solid or disk wheel 113 is carried by this center portion. The wheel is shown with a flanged rim 114, but obviously may be of any desired structure or design. A relatively large axial opening 115 is provided in the center of the wheel. An internal, annular, concentric rib or bead 116 is formed on the marginal portion of the opening 115 so as to be disposed about the inner periphery of the wheel. The bead is rectangular in crosssection, although other shapes may be used, and somewhat thicker than the body of the wheel, thereby projecting beyond either face of the latter.

The bead 116 and the central portion of the wheel are embedded in the resilient element 110 so as to be situated concentrically of the opening 111. The inside diameter of the bead is such as to space it a short distance radially outward from the wall of the opening 11, but radially inward from the bolts or rivets 112. Suitable oversize openings 117 extend transversely of the wheel to receive said rivets, it being noted that said openings are larger than the rivets so as to provide ample clearance therebetween.

The wheel may be imbedded in the resilient element by molding the latter around and about the bead and disk, or by making the element in two closely-fitting halves, or by any other suitable method. As shown in the drawings, the wheel is disposed midway between the top and bottom faces of the resilient element 110 and extends radially outward between the inner edges of the flanges 103 and 104. The clearance between these flanges is such as to prevent their engaging the wheel, this space being occupied by a peripheral flange 118 formed on the element 110 on either side of the body of the wheel.

As pointed out in connection with the previously-described forms of the invention, a substantially shock and vibration-free structure is thus provided. All metal to metal connections between the wheel rim and the shaft are eliminated with provision being made for distortion of the resilient element. At the same time, a secure and relatively rigid structure is obtained.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A shock-absorbing wheel including, a hub adapted to receive a shaft, a shaft extending through the hub, a marginal flange on the hub, a cover plate having a complementary marginal flange and a recess for receiving the end of the shaft, said plate abutting the hub so as to form a housing within the marginal flanges, a resilient disk-shaped element having a snug fit within the housing, anchor means imbedded in the resilient element, spokes radiating from said anchor means, a rim carried on the outer ends of the spokes, the marginal flanges having notches to receive said spokes, and means engaging the end of the shaft for urging the hub and the cover plate together against the resilient element.

2. A shock absorbing wheel as set forth in claim 1 wherein the shaft engaging means is disposed wholly within the recess.

3. A shock absorbing wheel including, a hub adapted to receive a shaft, a shaft extending through the hub, a marginal flange on the hub, a cover plate having a complementary marginal flange and a recess for receiving the end of the shaft, said plate abutting the hub so as to form a housing within the marginal flanges, a resilient disk-shaped element having a snug fit within the housing, a plurality of arcuate anchor members embedded in the resilient element, said members being spaced from one another by the resilient element, spokes radiating from said anchor members, a rim carried on the outer ends of the spokes, the marginal flanges having notches to receive said spokes, and means engaging the end of the shaft for urging the hub and the cover together against the resilient element.

JOHN W. KAYE.

REFERENCES CITED

The following references are of record in the file of this patent:

UNITED STATES PATENTS

| Number | Name | Date |
| --- | --- | --- |
| 1,651,009 | White | Nov. 29, 1927 |
| 1,684,596 | Patch | Sept. 18, 1928 |
| 1,711,819 | White | May 7, 1929 |
| 2,128,069 | Ashby | Aug. 23, 1938 |